(12) United States Patent
Lan et al.

(10) Patent No.: US 11,355,942 B2
(45) Date of Patent: Jun. 7, 2022

(54) CAR CHARGER

(71) Applicant: ASAP TECHNOLOGY (JIANGXI) CO., LIMITED, Ji'an County (CN)

(72) Inventors: Rong-Qin Lan, Dongguan (CN); Min Fan, Dongguan (CN); Yun Feng, Dongguan (CN)

(73) Assignee: ASAP TECHNOLOGY (JIANGXI) CO., LIMITED, Ji'An County (CN)

( * ) Notice: Subject to any disclaimer, the term of this patent is extended or adjusted under 35 U.S.C. 154(b) by 118 days.

(21) Appl. No.: 16/912,455

(22) Filed: Jun. 25, 2020

(65) Prior Publication Data

US 2020/0328607 A1 Oct. 15, 2020

(30) Foreign Application Priority Data

Feb. 21, 2020 (CN) .......................... 202020193340.1

(51) Int. Cl.
*H02J 7/00* (2006.01)
*H01R 31/06* (2006.01)

(52) U.S. Cl.
CPC .......... *H02J 7/0045* (2013.01); *H02J 7/0044* (2013.01); *H01R 31/065* (2013.01)

(58) Field of Classification Search
CPC ...... H02J 7/0042; H02J 7/0044; H02J 7/0045; H01R 31/065
USPC .................................. 320/103, 107, 111, 114
See application file for complete search history.

(56) References Cited

U.S. PATENT DOCUMENTS

| | | | | |
|---|---|---|---|---|
| 9,543,778 B1* | 1/2017 | Corti | ....................... | H02J 5/005 |
| 9,991,629 B1* | 6/2018 | Chien | .................... | H01R 24/38 |
| 2005/0041827 A1* | 2/2005 | Wu | ......................... | H02J 7/342 |
| | | | | 381/323 |
| 2008/0185990 A1* | 8/2008 | Hsu | ....................... | H01M 50/20 |
| | | | | 320/103 |
| 2009/0200984 A1* | 8/2009 | Meincke | ............. | H04R 25/602 |
| | | | | 320/107 |
| 2014/0254844 A1* | 9/2014 | Shennib | ................. | H04R 25/00 |
| | | | | 381/323 |
| 2015/0028797 A1* | 1/2015 | Miller | .................... | H02J 7/342 |
| | | | | 320/103 |

* cited by examiner

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

A car charger includes a main body, a charging slot, and a charging module. The main body has an insertion portion and a top portion. The charging slot is located at the top portion. The charging slot has a concave surrounding wall, and the surrounding wall has a receiving space. The charging module includes an input terminal, a first charging terminal, and a conversion circuit. The input terminal is located at the insertion portion. The first charging terminal is located at the surrounding wall. The conversion circuit is electrically connected to the input terminal and the first charging terminal. The conversion circuit is configured to convert power from the input terminal and output the power to the first charging terminal.

10 Claims, 6 Drawing Sheets

CAR CHARGER

CROSS-REFERENCE TO RELATED APPLICATION

This non-provisional application claims priority under 35 U.S.C. § 119(a) to Patent Application No. 202020193340.1 filed in China, P.R.C. on Feb. 21, 2020, the entire contents of which are hereby incorporated by reference.

BACKGROUND

Technical Field

The present invention relates to a car charger, and more particularly, to a car charger having a charging slot.

Related Art

A general car charger may provide a low-voltage power source output. An electronic device is electrically connected to the car charger through, for example, a cable and a USB connector and is able to receive power converted and output via a transformer circuit. However, an external cable is required, and there is limitation in use.

SUMMARY

The technical problem to be solved by the present invention is that a car charger is limited in use due to requiring an external cable.

In view of this, some embodiments of the present invention provide a car charger.

The car charger according to an embodiment of the present invention includes a main body, a charging slot, and a charging module. The main body has an insertion portion and a top portion. The charging slot is located at the top portion. The charging slot has a concave surrounding wall, and the surrounding wall has a receiving space. The charging module includes an input terminal, a first charging terminal, and a conversion circuit. The input terminal is located at the insertion portion. The first charging terminal is located at the surrounding wall. The conversion circuit is electrically connected to the input terminal and the first charging terminal. The conversion circuit is configured to convert power from the input terminal and output the power to the first charging terminal.

In an embodiment, the main body further includes a cover that is located at the top portion. The charging slot is provided on the cover. The charging slot further has a carrying plate. The surrounding wall is located between the carrying plate and the cover.

In an embodiment, the carrying plate is inclined relative to the cover.

In an embodiment, the surrounding wall has a head portion and a tail portion. The carrying plate is connected to the tail portion. The carrying plate and the head portion are spaced apart from each other to form a through opening. The first charging terminal is located at the tail portion.

In an embodiment, a magnet is further included. The magnet is located on the other side of the carrying plate relative to the receiving space.

In an embodiment, the cover is convex or polygonal.

In an embodiment, a socket is further included. The charging module further includes a second charging terminal. The socket is located at the top portion. The second charging terminal is located at the socket. The conversion circuit is also electrically connected to the input terminal and the second charging terminal. The conversion circuit is further configured to convert power from the input terminal and output the power to the second charging terminal.

In an embodiment, the main body further includes a main shell and a sleeve shell. The main shell is located at the insertion portion. The sleeve shell is located at the top portion. One side of the sleeve shell is connected to the cover and the other side is connected to the main shell. The input terminal is provided at the main shell. The socket is provided at the cover or the sleeve shell.

In an embodiment, the surrounding wall has a finger escaping recess at an entrance of the receiving space.

In an embodiment, the conversion circuit further has a light emitting element, a light guiding element, and a driving circuit. The driving circuit is electrically connected to the conversion circuit and the light emitting element. The light emitting element is adjacent to the light guiding element. The light guiding element has an exposed portion that is exposed from the top portion. When the conversion circuit receives power, the driving circuit drives the light emitting element to emit light, and the light guiding element guides the light to the exposed portion.

In an embodiment, the socket is a USB interface, and the charging slot is a earphone charging slot. There are a plurality of sockets provided on different sides of the charging slot respectively or on the same side of the charging slot.

Accordingly, the car charger brings practical functions such as simple plug-and-charge and compact storage through structural improvements. The receiving space in the surrounding wall and the first charging terminal on the surrounding wall are mainly used to charge a gadget, so there is no need to use other cables and traditional USB plugs. Moreover, the receiving space may receive the gadget to hold the gadget during driving, thereby avoiding poor charging contact or even charging failure due to shaking or falling, and allowing users to charge and store the gadget in the vehicle. It is convenient to take and use the gadget as needed, and the driver has no need to find a falling gadget since the gadget can be held in the car charger being plugged in a car charger slot, thereby having an effect of improving driving safety.

Detailed descriptions will be provided by using specific embodiments with reference to the accompanying drawings, so that it is easier to understand the purpose, technical content, characteristics of the present invention and the effects that can be achieved by the present invention.

DETAILED DESCRIPTION

Figure 1:
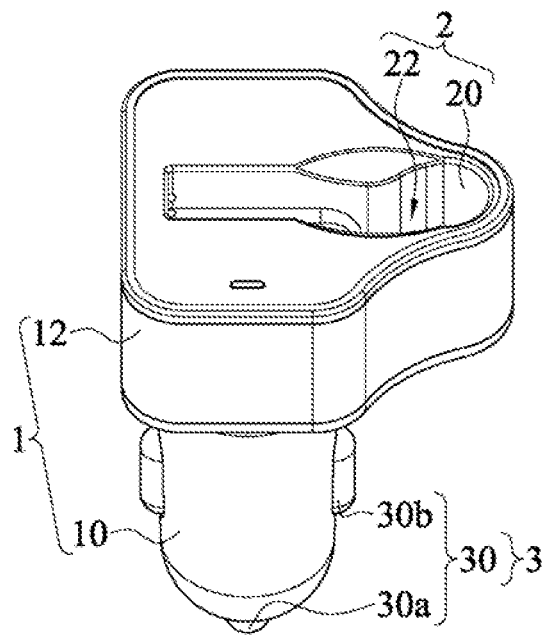
FIG. 1 is a schematic view of a car charger according to an embodiment of the present invention.

The embodiments of the present invention will be described in detail below by way of example and with reference to the accompanying drawings. In the specification, numerous specific details are set forth to provide a thorough understanding of the present invention. However, the present invention may be practiced without some or all of the specific details. The same or similar components in the drawings will be denoted by the same or similar symbols. It should be specifically noted that the drawings are used only for the purpose of illustration and do not represent an actual size or quantity of components. Some details may not be drawn for concise drawings.

Figure 2:
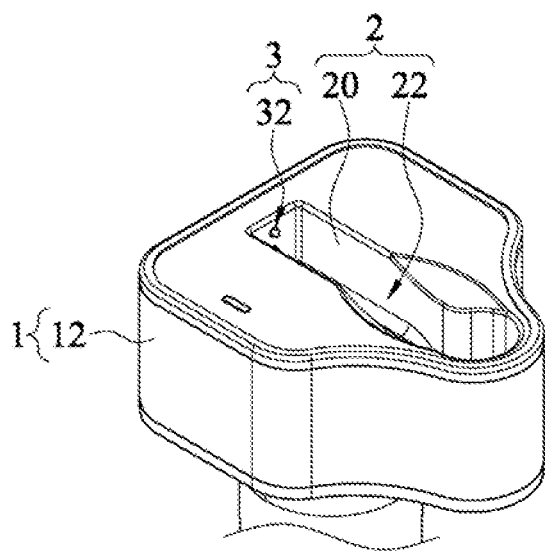
FIG. 2 is a schematic partial view of the embodiment shown in FIG. 1.
Figure 3:
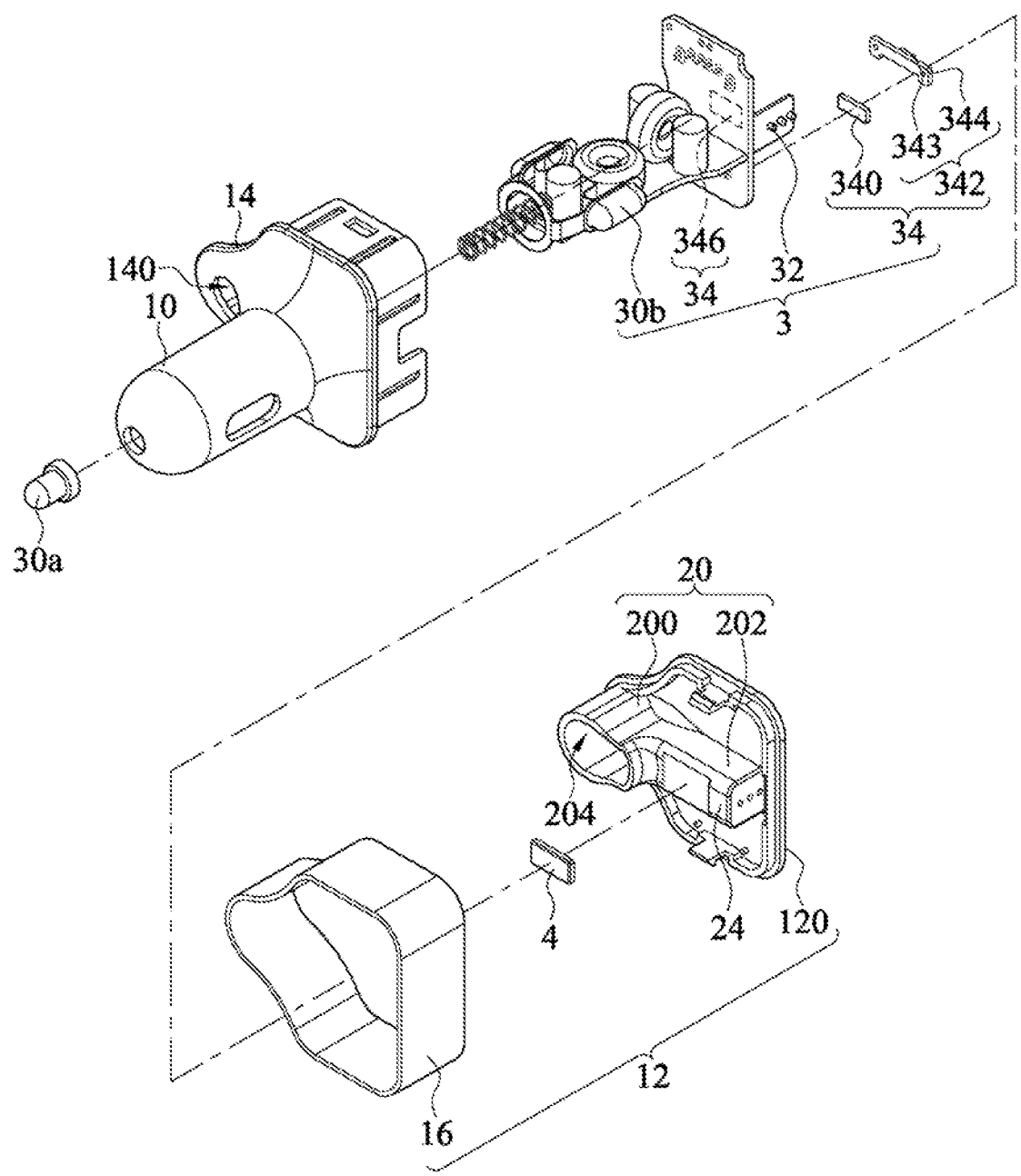
FIG. 3 is a schematic exploded view of the embodiment shown in FIG. 1.

FIG. 1 is a schematic view of a car charger according to an embodiment of the present invention. FIG. 2 is a schematic partial view of the embodiment shown in FIG. 1. FIG. 3 is a schematic exploded view of the embodiment shown in FIG. 1.

Please refer to FIGS. 1 to 3 together. In this embodiment, the car charger includes a main body 1, a charging slot 2, and a charging module 3. The main body 1 has an insertion portion 10 and a top portion 12. The insertion portion 10 may have a corresponding geometric shape by matching a slot structure of a vehicle charging base, for example, but not limited to, a column shape as shown in FIG. 1. The car charger is inserted into a slot of the vehicle charging base (such as a car cigarette lighter socket) through the insertion portion 10. An electrical connection contact of the insertion portion 10 and an electrical connection contact in the slot of the vehicle charging base are connected so as to be electrically connected to a power supply system on a vehicle. The top portion 12 is exposed from the vehicle charging base, and a surface of the top portion 12 is recessed to form the charging slot 2 to facilitate a user to store a gadget. In some embodiments, the gadget may be, for example, but not limited to, a wireless earphone or a smart watch, and the gadget is rechargeable.

Specifically, the charging slot 2 is located at the top portion 12. The charging slot 2 has a concave surrounding wall 20, and the surrounding wall 20 has a receiving space 22. For example, an upper end of the top portion 12 has a plane, and the surrounding wall 20 extends downward relative to the plane, thereby forming the surrounding wall 20 having a concave shape. The surrounding wall 20 may include a surrounding vertical side wall to define the receiving space 22. Here, the vertical side wall may be substantially perpendicular to the plane of the top portion 12. In some embodiments, the geometric shape of the receiving space 22 substantially matches the shape of a gadget (such as a wireless earphone). In other words, the surrounding wall 20 is shaped in accordance with the shape of the gadget to be received. Based on this, by defining the charging slot 2 as a profiled slot, storage stability can be enhanced, and gadgets can be stored and held more stably during driving. In other embodiments, the surrounding wall 20 is at an inclined angle rather than a vertical angle relative to the plane of the top portion 12, which is not limited to the structure shown in FIG. 1. In some embodiments, the charging slot 2 may be a profiled slot, for example, but not limited to, a square slot, a semi-circular slot, or an oval slot.

The charging module 3 includes an input terminal 30, a first charging terminal 32, and a conversion circuit 34. The input terminal 30 is located at the insertion portion 10. The first charging terminal 32 is located at the surrounding wall 20. The conversion circuit 34 is electrically connected to the input terminal 30 and the first charging terminal 32. For example, the input terminal 30 may be a metal conductive member. The first charging terminal 32 may be, for example but not limited to, a metal elastic bump. The first charging terminal 32 may be a conductive contact for elastically abutting a gadget received in the charging slot 2. The conversion circuit 34 may be implemented by, for example but not limited to, a printed circuit board. In this embodiment, the input terminal 30 has a positive elastic contact cap 30*a* (i.e., the foregoing electrical connection contact) at the tail end of the insertion portion 10 and negative elastic contact pieces 30*b* (i.e., the foregoing electrical connection contact) on both sides of the insertion portion 10, and the input terminal 30 is electrically connected to the conversion circuit 34. In other embodiments, the first charging terminal 32 may be a plurality of metal elastic bumps that may be arranged vertically or horizontally.

When the car charger is inserted into the vehicle charging base and the gadget is placed in the charging slot 2, the input terminal 30 on the insertion portion 10 is electrically connected to positive and negative electrodes of the power supply system on the vehicle to input power to the conversion circuit 34. Next, the conversion circuit 34 receives the power from the input terminal 30 and converts the power into power with an appropriate voltage, and then outputs the power from the first charging terminal 32 to the gadget in the charging slot 2.

According to the above structure, the car charger stably stores and charges a gadget (such as a wireless earphone) through the receiving space 22 and the first charging terminal 32 of the charging slot 2, thereby avoiding poor charging contact or even charging failure due to shaking or falling during driving, also preventing drivers from being distracted to find falling gadgets, and improving driving safety.

In some embodiments, referring to FIG. 3, the main body 1 further includes a cover 120. The cover 120 may be, but is not limited to, a planar plate structure. The cover 120 is located at the top portion 12, and the charging slot 2 is provided on the cover 120. Therefore, when the car charger is inserted into the slot of the vehicle charging base, the cover 120 will be exposed from the vehicle charging base for convenient operation.

Figure 4A:
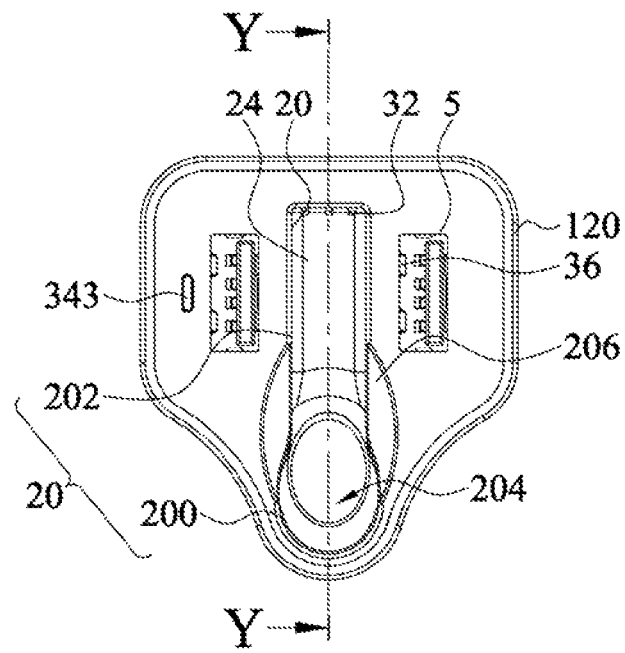
FIG. 4*a* is a schematic top view of a car charger according to at least one embodiment of the present invention.

In some embodiments, referring to FIG. 3 and FIG. 4*a*, the charging slot 2 further includes a carrying plate 24. The carrying plate 24 is connected to the other side of the surrounding wall 20 relative to the cover 120. That is, the surrounding wall 20 is located between the carrying plate 24 and the cover 120. They are connected to each other to define the receiving space 22 suitable for receiving the gadget. Further, the main body 1 further includes a main shell 14 and a sleeve shell 16. The main shell 14 is located at the insertion portion 10. The sleeve shell 16 is located below the cover 120 of the top portion 12. One side of the sleeve shell 16 is connected to the cover 120 and the other side is connected to the main shell 14. In other words, the cover 120, the sleeve shell 16, and the main shell 14 are sequentially connected to constitute the main body 1. Here, the input terminal 30 is provided at the main shell 14.

In some embodiments, the car charger further includes a magnet 4, and the magnet 4 is located on the other side of the carrying plate 24 relative to the receiving space 22. For example, the magnet 4 is located below the carrying plate 24. Based on this, a magnetic force generated by the magnet 4 acts on the gadget. The gadget on the carrying plate 24 may be stably held to be stably stored in the charging slot 2. It is not easy to be affected by bumps and vibrations during driving to achieve a good charging contact. In some embodiments, the magnet 4 that attracts the gadget may be a rectangular parallelepiped, a cylinder, or other shaped bodies.

In some embodiments, referring to FIG. 3, the conversion circuit 34 further includes a light emitting element 340, a light guiding element 342, and a driving circuit 346. The driving circuit 346 is electrically connected to the conversion circuit 34 and the light emitting element 340. The light emitting element 340 is adjacent to the light guiding element 342. The light guiding element 342 includes an exposed portion 343 and a light guide 344. The exposed portion 343 is located on the light guide 344 and is exposed from the top portion 12 (see FIG. 4a). For example, the light emitting element 340 may be, but is not limited to, a light emitting diode group. The light guiding element 342 may be a light guiding sheet or a light guiding strip, for example, but not limited to, light transmitting materials such as acrylic, resin, and plastic.

When the conversion circuit 34 receives power from the input terminal 30, the driving circuit 346 may convert the power to power corresponding to voltage requirements of the light emitting element by itself, or perform voltage conversion through the conversion circuit 34, and then output the transformed power to drive the light emitting element 340. The light emitting element 340 emits light after being driven, and the emitted light enters the light guiding element 342. After the light enters the light guiding element 342, the light guide 344 guides the light to the exposed portion 343 to indicate that the car charger is charging the gadget as a reminder of a charging status.

Figure 4B:
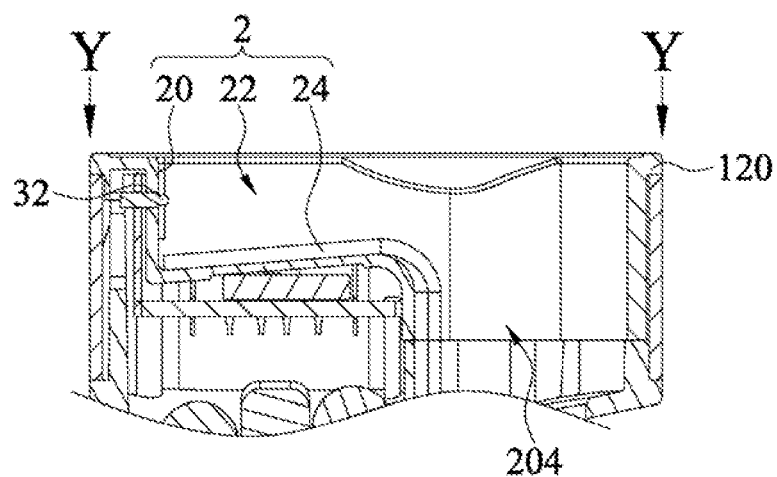
FIG. 4*b* is a schematic cross-sectional view of the car charger of the embodiment shown in FIG. 4*a* along a YY direction.

Please refer to FIG. 4a and FIG. 4b. FIG. 4a is a schematic top view of a car charger according to at least one embodiment of the present invention. FIG. 4b is a schematic cross-sectional view of the car charger of the embodiment shown in FIG. 4a along a YY direction. In some embodiments, in order to assist a user in picking up and placing a gadget, the carrying plate 24 is inclined at an angle relative to the cover 120 to adjust a placement angle of the gadget. For example, an angle of inclination may be 10 degrees to 45 degrees. In this way, when the user places the gadget from top to bottom, the user only needs to rotate the gadget slightly to easily store it in the charging slot 2 without turning the gadget to be aligned with the cover 120. In addition, the angle of inclination also has the effect of easily removing the gadget. For example, the horizontal placement of the gadget is changed into placement at a certain angle of inclination (e.g., 20 degrees) or vertical insertion (i.e., 90 degrees).

In some embodiments, the surrounding wall 20 has a finger escaping recess 206 at an entrance of the receiving space 22, which also helps the user to easily remove the gadget with bare hands. In some embodiments, the surrounding wall 20 has a head portion 200 and a tail portion 202. The carrying plate 24 is connected to the other side of the tail portion 202 relative to the cover 120. That is, the tail portion 202 of the surrounding wall 20 is located between the carrying plate 24 and the cover 120. Here, the first charging terminal 32 is located at the tail portion 202 of the surrounding wall 20. The carrying plate 24 and the head portion 200 are spaced apart from each other to form a through opening 204. In some embodiments, viewing the car charger from above, the through opening 204 will penetrate through the cover 120 and also through a corresponding through hole 140 of the main shell 14, or the through opening 204 connects an upper side of the head portion 200 and a lower side of the head portion 200. In addition to allowing debris and dust to leak out easily, the through opening 204 also has the effect of easily removing the gadget. That is, a user can use a finger to push an earplug portion of a wireless earphone from the through opening 204 from bottom to top, or press the earplug portion from top to bottom to cause a tail end of the wireless earphone to lift, so that the tail end of the wireless earphone is far away from the tail portion 202 of the receiving space 22, which makes it easier for the user to remove the wireless earphone.

In some embodiments, the car charger further includes a socket 5. The socket 5 is located at the top portion 12. Here, the charging module 3 further includes a second charging terminal 36. The second charging terminal 36 is located in the socket 5. The conversion circuit 34 is also electrically connected to the second charging terminal 36. According to this structure, an electrical connection end of an external electronic device to be charged can be inserted into the socket 5 and electrically connected to the second charging terminal 36 in the socket 5. While the conversion circuit 34 converts power from the input terminal 30, the converted power may be output from the first charging terminal 32 to the gadget in the charging slot 2, and the power may also be output from the second charging terminal 36 to the external electronic device to be charged. In some embodiments, the specification of the socket 5 may be a USB output interface, for example but not limited to: type-C, type-A, and Micro-B interface specifications. The external electronic device to be charged may be, for example, a mobile phone, a tablet, a portable multimedia player, and other consumer products. For example, in some embodiments, the socket 5 is a USB interface, and the charging slot 2 is a wireless earphone charging slot.

Figure 5A:
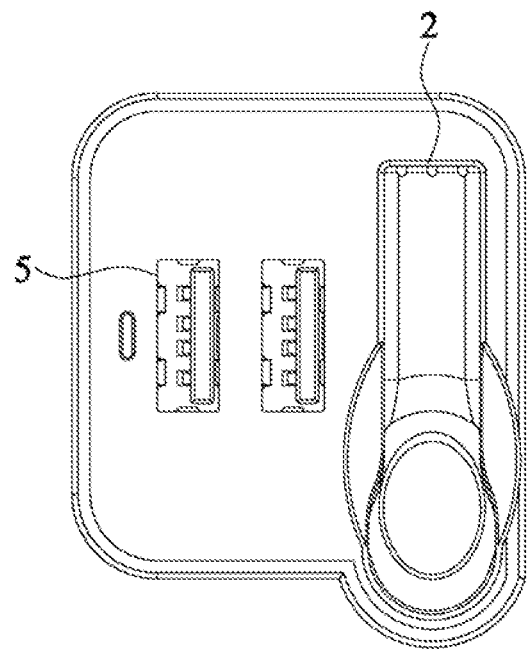
FIG. 5*a* is a schematic top view of a car charger according to at least one embodiment of the present invention.
Figure 5B:
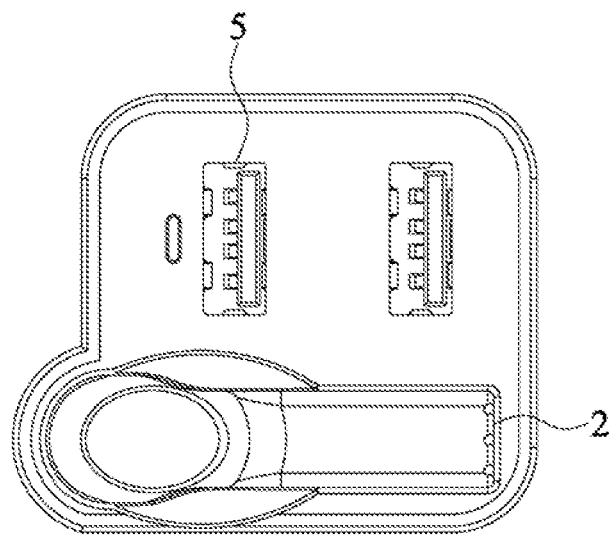
FIG. 5*b* is a schematic top view of a car charger according to at least one embodiment of the present invention.
Figure 6:
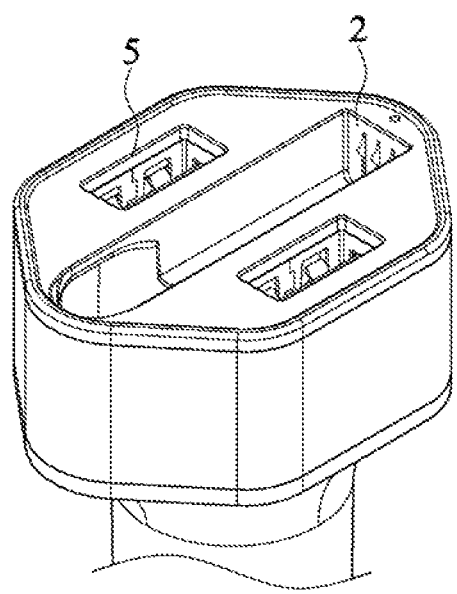
FIG. 6 is a schematic partial view of a car charger according to at least one embodiment of the present invention.

In different embodiments, the contour of the cover 120 may be, but not limited to, polygonal such as convex (as shown in FIG. 4a), quadrilateral (as shown in FIG. 5a and FIG. 5b, the quadrangles referred to herein include but are not limited to rectangles and quasi-quadrangles, etc.) or hexagonal (as shown in FIG. 6). In some embodiments, as shown in FIGS. 4a, 5a, and 5b, the number of the sockets 5 is plural. In an example, a plurality of sockets 5 are respectively provided on different sides of the charging slot 2, as shown in FIG. 4a. In other examples, the number of the sockets 5 is plural, and the plurality of sockets 5 are provided on the same side of the charging slot 2, as shown in FIGS. 5a and 5b.

In some embodiments, the relative positions of the socket 5 and the charging slot 2 are also different. For example, a long-side direction of the socket 5 and a long-side direction of the charging slot 2 are parallel to each other, as shown in FIG. 5a. In another example, the long-side direction of the socket 5 and the long-side direction of the charging slot 2 are perpendicular to each other, as shown in FIG. 5b. In some embodiments, a plurality of USB interface sockets 5 may be arranged obliquely (not shown in the figure), and a specific angle is formed with each other to meet the design requirements of the top portion 12. However, it is not limited thereto.

Figure 7A:
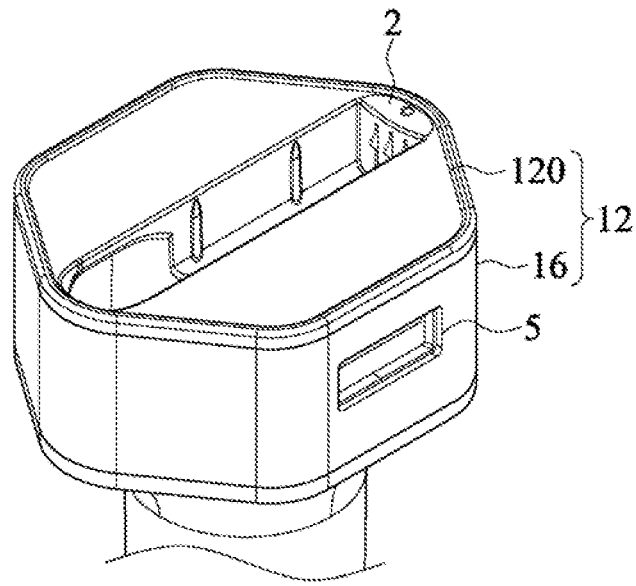
FIG. 7*a* is a schematic partial view of a car charger according to at least one embodiment of the present invention.
Figure 7B:
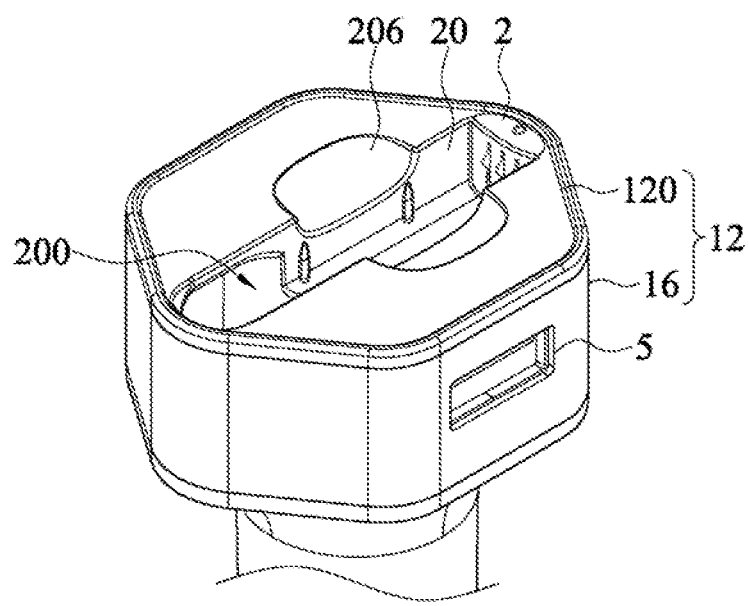
FIG. 7*b* is a schematic partial view of a car charger according to at least one embodiment of the present invention.

In some embodiments, referring to FIG. 7a, the charging slot 2 is located at the cover 120, and at least one socket 5 is located at the sleeve shell 16. In other words, the socket 5 and the charging slot 2 may be separately provided on an upper surface and a side surface of the top portion 12. In this way, more surface area of the charging slot 2 on the cover 120 is available for design and use. For example, referring to FIG. 7*b*, the charging slot 2 has a finger escaping recess 206 at an entrance, which helps to remove the gadget with bare hands. Meanwhile, the car charger charges other consumer electronics products through the socket 5 on the sleeve shell 16.

Based on the foregoing, some embodiments of the present invention provide a car charger, which mainly uses the receiving space 22 in the surrounding wall 20 and the first charging terminal 32 on the surrounding wall 20 to receive and charge a gadget. Therefore, there is no need to use other cables and traditional USB plugs. Moreover, the gadget is held during driving by means of the concave charging slot 2, thereby avoiding poor charging contact or even charging failure due to shaking or falling, and allowing users to charge and store the gadget on a vehicle. It is convenient to take and use the gadget as needed, and the driver has no need to find a falling gadget since the gadget can be held in the car charger being plugged in a car charger slot. Thereby the car charger of the embodiments has the functions of simple operation, plug-and-charge and compact storage, and improves charging stability during driving and driving safety, and the like.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A car charger, comprising:
    a main body, having an insertion portion and a top portion;
    a charging slot, located at the top portion and having a concave surrounding wall, the surrounding wall having a receiving space; and
    a charging module, comprising:
        an input terminal, located at the insertion portion;
        a first charging terminal, located at the surrounding wall; and
        a conversion circuit, electrically connected to the input terminal and the first charging terminal, the conversion circuit being configured to convert power from the input terminal and output the power to the first charging terminal;
    wherein the main body further comprises a cover that is located at the top portion, the charging slot is provided on the cover, the charging slot further has a carrying plate, and the surrounding wall is located between the carrying plate and the cover.

2. The car charger according to claim 1, wherein the carrying plate is inclined relative to the cover.

3. The car charger according to claim 1, wherein the surrounding wall has a head portion and a tail portion, the carrying plate is connected to the tail portion, the carrying plate and the head portion are spaced apart from each other to form a through opening, and the first charging terminal is located at the tail portion.

4. The car charger according to claim 1, further comprising: a magnet, located on the other side of the carrying plate relative to the receiving space.

5. The car charger according to claim 1, wherein the cover is convex or polygonal.

6. The car charger according to claim 1, further comprising a socket, wherein the charging module further comprises a second charging terminal, the socket is located at the top portion, the second charging terminal is located at the socket, the conversion circuit is also electrically connected to the input terminal and the second charging terminal, and the conversion circuit is further configured to convert power from the input terminal and output the power to the second charging terminal.

7. The car charger according to claim 6, wherein the main body further comprises a main shell and a sleeve shell, the main shell is located at the insertion portion, the sleeve shell is located at the top portion, one side of the sleeve shell is connected to the cover and the other side is connected to the main shell, the input terminal is provided at the main shell, and the socket is provided at the cover or the sleeve shell.

8. The car charger according to claim 6, wherein the socket is a USB interface, the charging slot is an earphone charging slot, and there are a plurality of sockets provided on different sides of the charging slot respectively or on a same side of the charging slot.

9. The car charger according to claim 1, wherein the surrounding wall has a finger escaping recess at an entrance of the receiving space.

10. The car charger according to claim 1, wherein the conversion circuit further has a light emitting element, a light guiding element, and a driving circuit, the driving circuit is electrically connected to the conversion circuit and the light emitting element, the light emitting element is adjacent to the light guiding element, the light guiding element has an exposed portion that is exposed from the top portion, when the conversion circuit receives the power, the driving circuit drives the light emitting element to emit light, and the light guiding element guides the light to the exposed portion.

* * * * *